United States Patent [19]
Ohashi

[11] Patent Number: 6,025,933
[45] Date of Patent: *Feb. 15, 2000

[54] IMAGE PICKUP APPARATUS

[75] Inventor: Kazuhito Ohashi, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/953,844

[22] Filed: Oct. 14, 1997

Related U.S. Application Data

[63] Continuation of application No. 08/557,338, Nov. 14, 1995, abandoned.

[30] Foreign Application Priority Data

Nov. 15, 1994 [JP] Japan ................................. 6-280621

[51] Int. Cl.$^7$ ........................... H04N 1/40; G03G 15/041
[52] U.S. Cl. ................... 358/446; 358/475; 358/509; 399/198
[58] Field of Search ................................. 358/446, 445, 358/444, 443, 447, 474, 475, 480, 509, 510; 250/208.3, 208.1, 201.1, 204, 205, 559.2; 399/51, 52, 198, 200; 382/274, 317, 319, 312

[56] References Cited

U.S. PATENT DOCUMENTS

| | | | |
|---|---|---|---|
| 3,765,776 | 10/1973 | Bravenec | 356/419 |
| 3,767,907 | 10/1973 | Radcliffe, Jr. | 382/119 |
| 4,408,231 | 10/1983 | Bushaw et al. | 358/475 |
| 4,766,503 | 8/1988 | Lambert et al. | 358/332 |
| 4,951,135 | 8/1990 | Sasagawa et al. | 358/446 |
| 5,053,808 | 10/1991 | Takagi | 355/38 |
| 5,151,796 | 9/1992 | Ito et al. | 358/461 |
| 5,414,535 | 5/1995 | Kanmoto et al. | 358/487 |
| 5,563,723 | 10/1996 | Beaulieu et al. | 358/461 |
| 5,726,437 | 3/1998 | Ashikaga et al. | 358/475 |

*Primary Examiner*—Edward L. Coles
*Assistant Examiner*—Madeleine Av Nguyen
*Attorney, Agent, or Firm*—Morgan & Finnegan, L.L.P.

[57] ABSTRACT

According to an image pickup apparatus of this invention, a light source illuminates an object, an image pickup unit picks up an image of the illuminated object, an amplifier circuit amplifies the output signal for the image pickup unit, and a control unit adjusts the light amount of the light source after setting the maximum gain of the amplifier circuit and controls the image pickup unit to pickup the image of the object. An image pickup operation can be performed by irradiating an object with a minimum amount of light that the circuitry is capable of coping with.

35 Claims, 9 Drawing Sheets

A PORTION OF DIFFUSE LIGHT FROM ORIGINAL SURFACE

REGULAR REFLECTION LIGHT FROM
SURFACE OF SOLID GLOSSY BODY

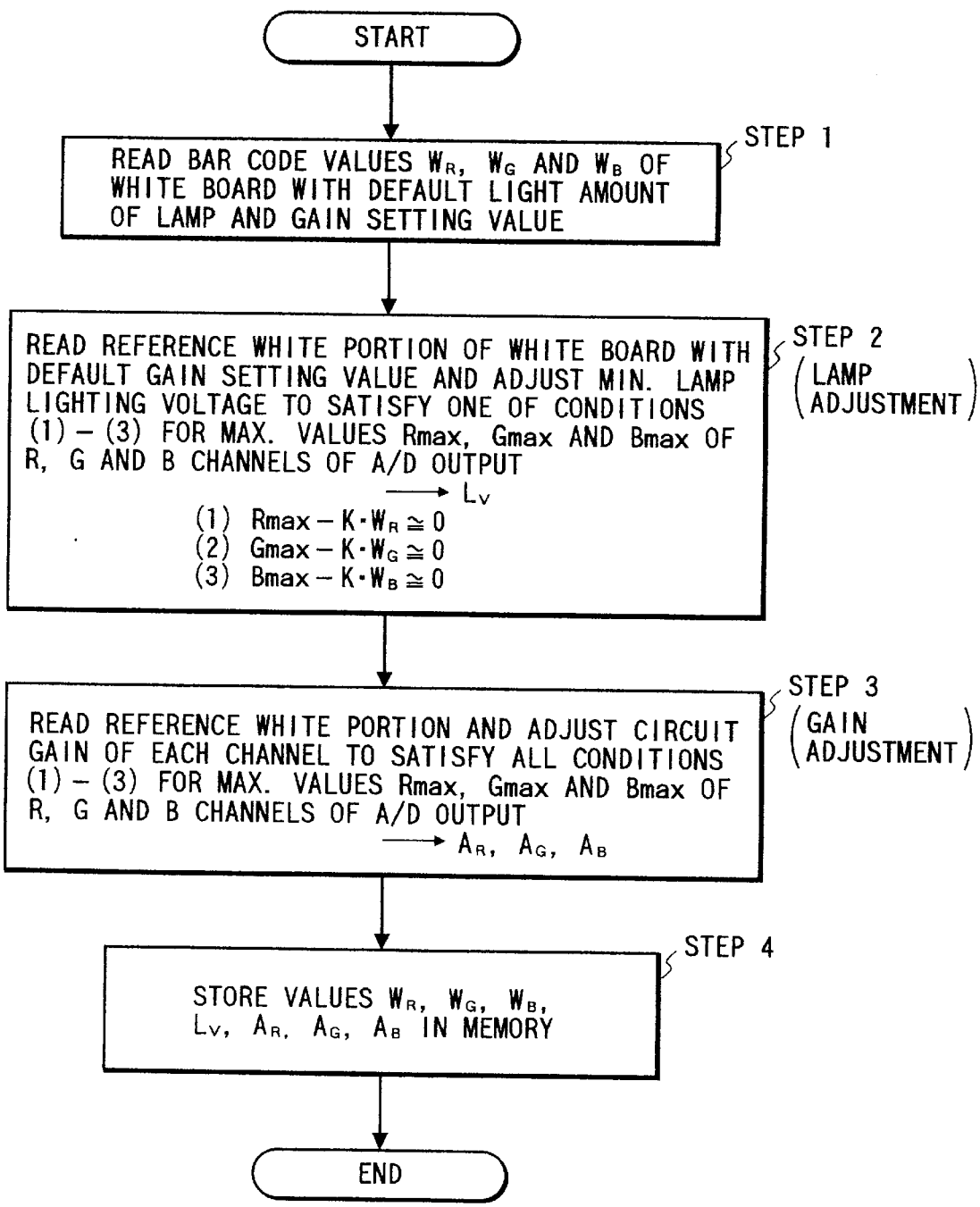

IMAGE PICKUP APPARATUS

This is a continuation of application Ser. No. 08/557,338, filed on Nov. 14, 1995 now abandoned.

BACKGROUND OF THE INVENTION

1. Field of the Invention

The present invention relates to an image pickup apparatus for picking up an object image illuminated with light emitted by a light source using an image pickup element such as a CCD.

2. Related Background Art

As a conventional image pickup apparatus using a solid-state image pickup element such as a CCD, a digital copying machine is known.

FIG. 1 shows the arrangement of the conventional digital copying machine. Referring to FIG. 1, the digital copy machine includes an original table glass 82 on which an original 81 is placed, a light source 83, reflection mirrors 84, 85, and 86, a CCD linear image sensor 88, a lens 87 for forming an image of light reflected by the original 81 on the light-receiving surface of the CCD linear image sensor 88, an amplifier 89 for amplifying the output signal from the CCD linear image sensor 88, an A/D converter 90 for converting the amplified CCD output signal into a digital signal, an image processing circuit 91, and a printer 92.

The digital copying machine with the above-mentioned arrangement reads some light components of light emitted from the illumination light source and diffused on the original surface using the CCD linear image sensor, as shown in FIG. 2.

In general, when the light amount exceeds a predetermined value, the output from the CCD linear image sensor 88 is saturated and the sensor 88 cannot obtain an output corresponding to an image. In view of this, the light amount of the light source 82 is set, so that the output from the CCD linear image sensor 88 is not saturated independently of the density of an original placed on the original table glass 82. Therefore, when a normal original is read, the CCD output signal is never saturated.

However, when a glossy body 101 (such as a wrinkled aluminum foil, spectacles with a metal frame, a wristwatch, a gem, or the like) is placed as an original on the original table glass 82, as shown in, e.g., FIG. 3, light emitted by the light source 83 is reflected by the glossy body 101, and forms an image on the CCD linear image sensor 88, as shown in FIG. 4. Note that an original cover 102 is used for pressing an original.

Although the intensity of the reflected light varies depending on the reflectance or position (reflection angle) of the glossy body 101, if the reflected light amount is equal to or larger than a predetermined amount, not only the output from the CCD linear image sensor 88 is saturated, but also blooming may occur in the CCD linear image sensor 88.

The blooming is a phenomenon that a charge generated upon incidence of light exceeding a predetermined amount on a given pixel in a CCD overflows to surrounding pixels. In this case, not only the CCD output is saturated but also signals from the surrounding pixels are destroyed, thus fatally damaging image quality.

A similar problem to that described above is posed in a case shown in FIG. 5 in addition to the above-mentioned case wherein the glossy body is placed on the original table glass. FIG. 5 shows an apparatus which illuminates a film 122 with light emitted by a light source 121, forms an optical image on an original table glass 125 via a lens 123 and a mirror 124, and copies the formed image. Note that a Fresnel lens 87 is used for preventing a light beam incident on the original table glass 125 from diffusing until it forms an image on the CCD linear image sensor 88.

As the film 122, both negative and positive films are available. Since a negative film has a dark base film portion (brightest portion), the light amount for the negative film is set to be considerably larger than that for a positive film to obtain an appropriate output from the CCD linear image sensor 88. Such light amount adjustment normally operates as an AE function, and cannot be controlled by a user.

However, if a negative film has, e.g., a pinhole in this state, light emitted by the light source 121 becomes incident on the CCD linear image sensor 88 via the pinhole. As in the above-mentioned glossy body, blooming may occur in this case.

As a method of solving this problem, the light amount of the light source is decreased to prevent blooming even when a glossy body is placed on the original table glass, or even when a negative film has a pinhole, as described above, and the CCD output is electrically amplified accordingly.

However, with this method, noise is added upon amplification by a circuit, and the S/N ratio is undesirably impaired even when no blooming has occurred.

SUMMARY OF THE INVENTION

It is an object of the present invention to provide an image pickup apparatus which can obtain a high-quality image independently of the object to be imaged.

It is another object of the present invention to provide an image pickup apparatus which can control the light amount without increasing noise.

It is still another object of the present invention to provide an image pickup apparatus which can prevent blooming without impairing the S/N ratio.

In order to achieve the above objects, an image pickup apparatus according to an embodiment of the present invention comprises a light source for illuminating an object, image pickup means for picking up an image of the object illuminated by the light source, amplifier means for amplifying an output signal from the image pickup means, and control means for adjusting a light amount of the light source after setting a maximum gain of the amplifier means, and controlling the image pickup means to pick up the image of the object. With this arrangement, since an image pickup operation can be performed while illuminating an object with a minimum amount of light the circuit is capable of coping with, blooming can be prevented without increasing noise. Therefore, a high-quality image can be obtained independently of the object to be imaged.

An image pickup apparatus according to another embodiment of the present invention comprises a light source for illuminating an object, image pickup means for picking up an image of the object illuminated by the light source, amplifier means for amplifying an output signal from the image pickup means, correction means for correcting an image signal output from the image pickup means, a reference density member having a reference density, and control means for picking up an image of the reference density member using the image pickup means, adjusting the light amount of the light source so that a maximum value of the output signal from the image pickup means becomes equal to or larger than a predetermined value after a maximum gain of the amplifier means is set, and obtaining a correction signal of the correction means by adjusting the gain of the amplifier means so that the maximum value of the signal becomes the predetermined value. With this arrangement, even when an image pickup operation can be performed while illuminating an object with a minimum amount of light the circuit is capable of coping with, since the output signal from the image pickup means can be corrected, a high-quality image can be obtained.

An image pickup apparatus according to still another embodiment of the present invention comprises a light source for illuminating an object, image pickup means for picking up an image of the object illuminated by the light source, switching means for switching a mode between a first mode for picking up the image of the object using the image pickup means, and a second mode for performing an image pickup operation of the image pickup means in a state wherein an amount of light irradiated onto the object by the light source is limited to be smaller than a light amount in the first mode, first storage means for storing an image pickup state by the image pickup means in the first mode, and second storage means for storing an image pickup state by the image pickup means in the second mode. With this arrangement, since the light amount can be controlled as needed, blooming can be prevented, and an image pickup operation with high image quality can be performed. Since the storage means are arranged in correspondence with the two modes, the two modes can be switched quickly.

Other objects and features of the present invention will become apparent from the following specification and the accompanying drawings.

BRIEF DESCRIPTION OF THE DRAWINGS

FIG. 9 is a flow chart showing a normal reading mode in the embodiment of the present invention;

DESCRIPTION OF THE PREFERRED EMBODIMENT

Figure 1:
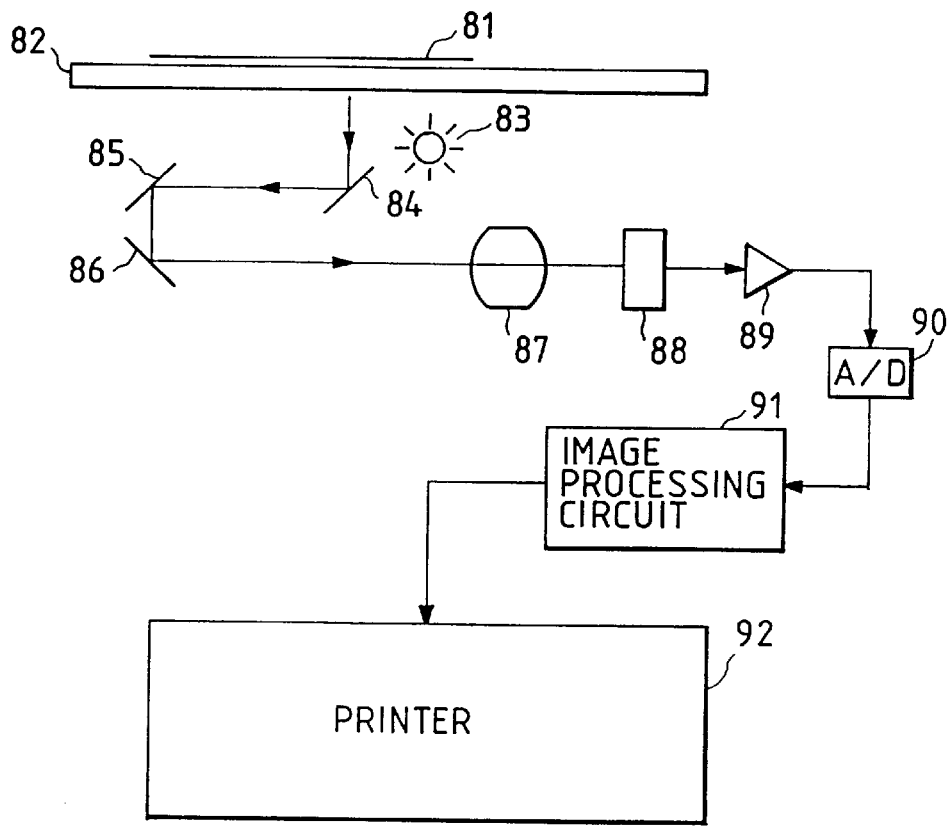
FIG. 1 is a block diagram showing the arrangement of a conventional image pickup apparatus.
Figure 2:
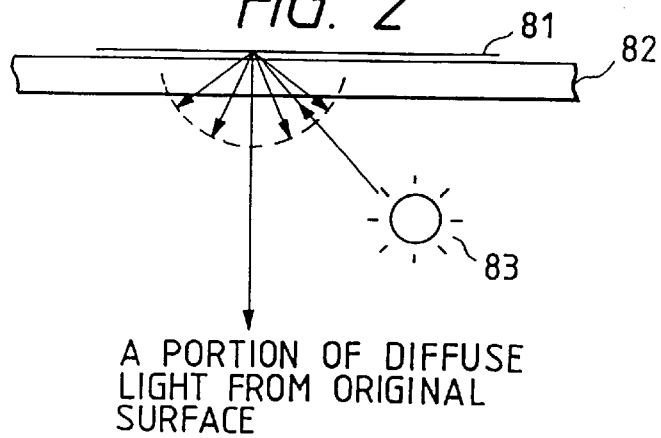
FIG. 2 is a view for explaining the principle of the conventional image pickup apparatus.
Figure 3:
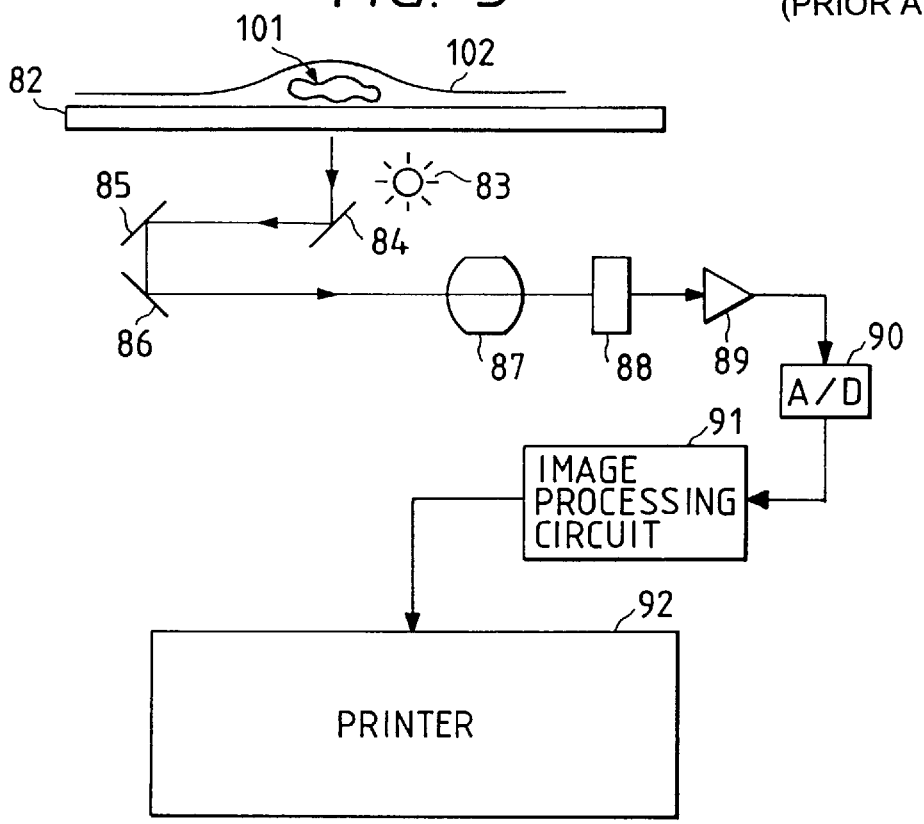
FIG. 3 is a block diagram showing the arrangement of a conventional image pickup apparatus.
Figure 4:
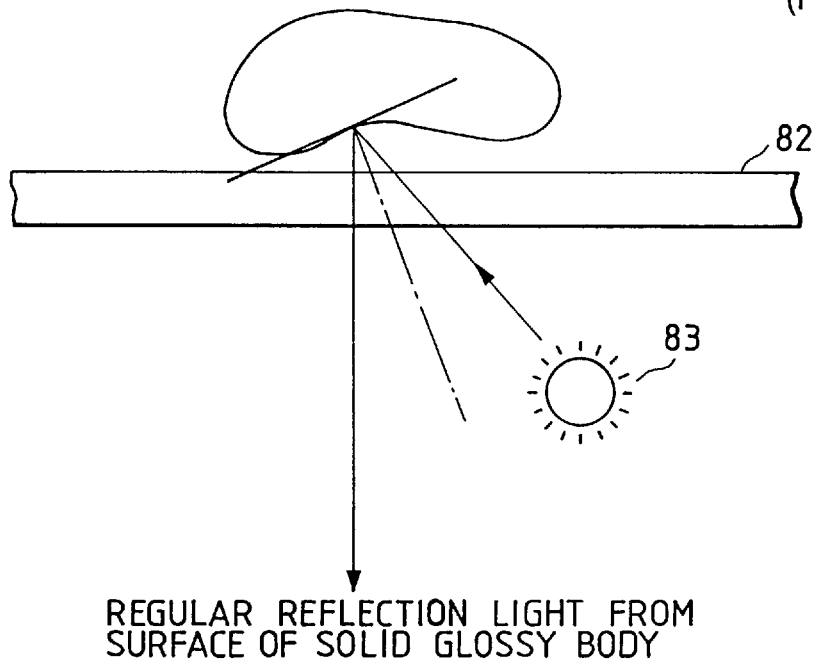
FIG. 4 is a view for explaining the principle of the conventional image pickup apparatus.
Figure 5:
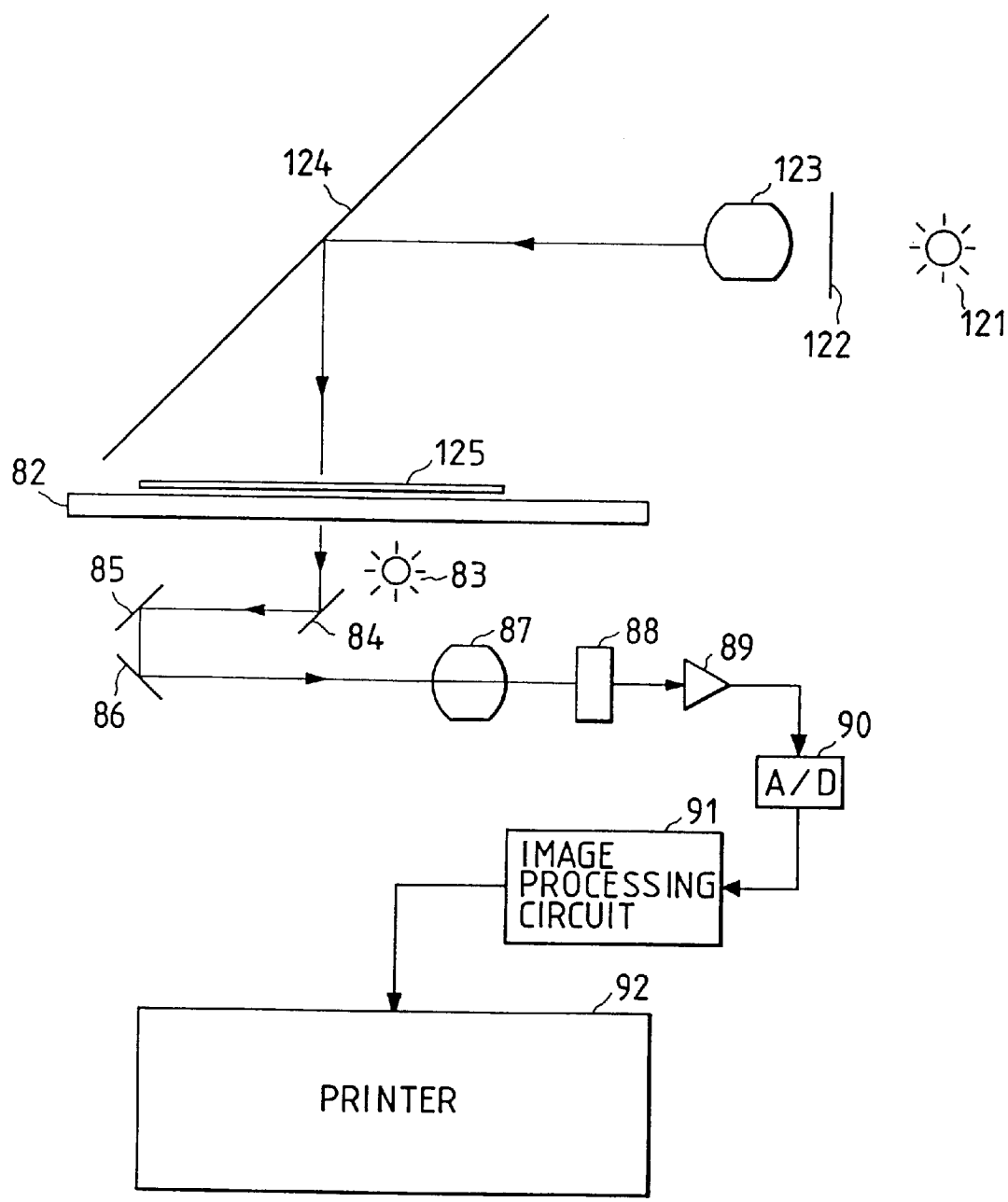
FIG. 5 is a block diagram showing the arrangement of a conventional image pickup apparatus.
Figure 6:
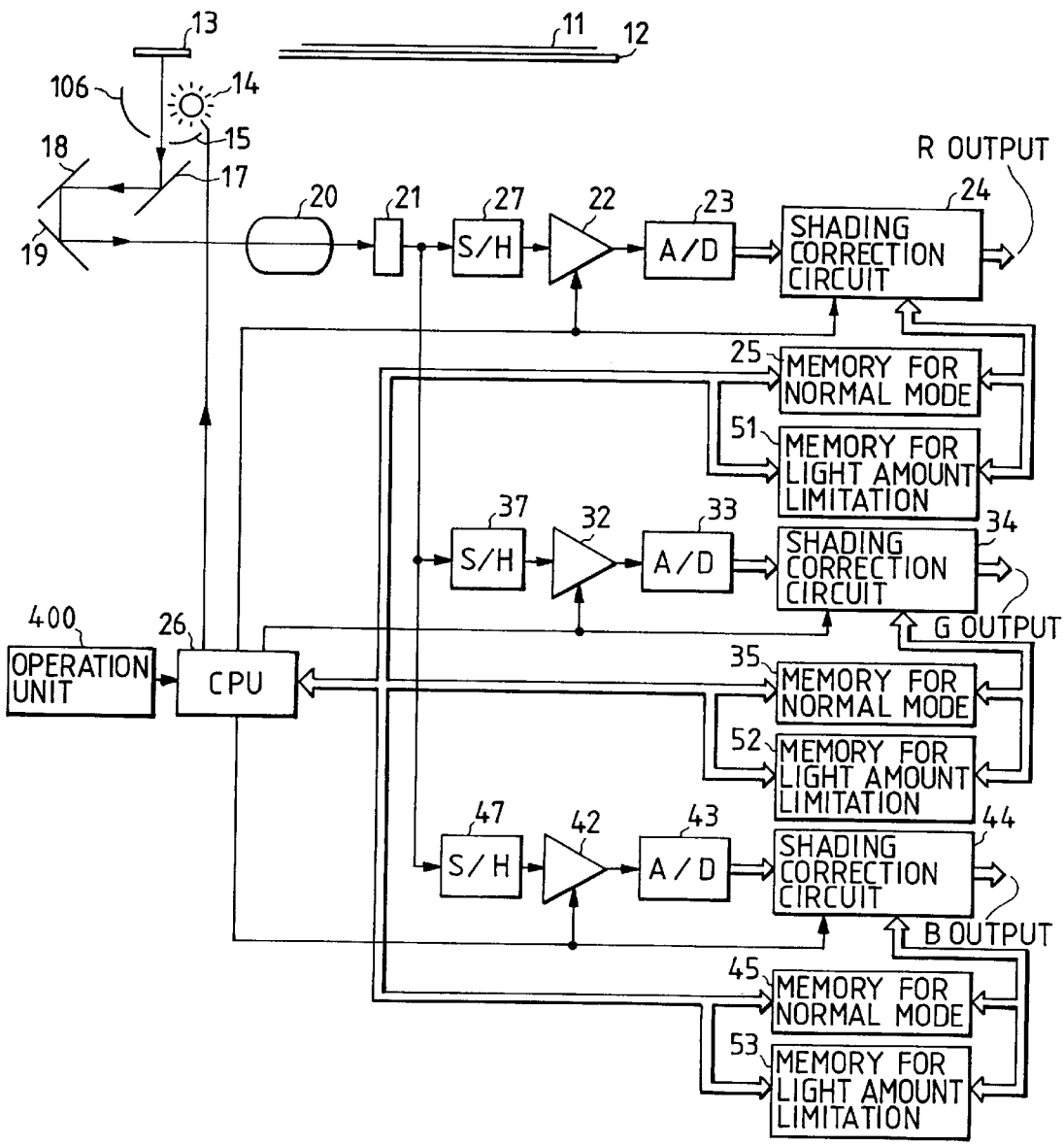
FIG. 6 is a block diagram showing the arrangement according to an embodiment of the present invention.

FIG. 6 is a block diagram showing the arrangement of an image pickup apparatus according to an embodiment of the present invention.

Referring to FIG. 6, the apparatus includes an original table glass 12 for placing an original 11 thereon, and a white plate 13 (to be described in detail later) serving as a reference density member. The apparatus also includes a light source (lamp) 14 for exposing the white plate 13 and the original 11 on the original table glass 12, reflection shades 15 and 16, reflection mirrors 17 to 19 for guiding light reflected by the white plate 13 or the original 11, a lens 20, and a CCD line sensor 21 having red (R), green (G), and blue (B) color-separation filters.

The apparatus further includes sample/hold circuits 27, 37, and 47 for sampling and holding R, G, and B analog signals from the CCD line sensor 21, and voltage control amplifiers 22, 32, and 42 for respectively controlling the voltages of the R, G, and B signals. Moreover, the apparatus includes A/D converters 23, 33, and 43 for converting the R, G, and B analog signals into digital signals. In addition, the apparatus includes shading correction circuits 24, 34, and 44 for correcting nonuniformity of the outputs from the CCD line sensor 21 caused by a nonuniform light amount of the light source, a variation in sensitivity of the CCD line sensor 21, distortion of the lens 20, or the like, memories 25, 35, and 45 for a normal mode, which memories store shading correction parameters of the shading correction circuits 24, 34, and 44 in a normal reading mode, memories 51, 52, and 53 for a light amount limitation mode, which memories store correction parameters in a light amount limitation mode (to be described later), and a CPU 26.

Note that the CPU 26 controls the lighting voltage on the basis of an input from an operation unit 400, and controls storage of the shading correction parameters in the memories 25, 35, and 45 for the normal mode or the memories 51, 52, and 53 for the light amount limitation mode. Also, the CPU 26 reads out data stored in the memories 25, 35, and 45 or the memories 51, 52, and 53, and executes arithmetic processing in the shading correction circuits 24, 34, and 44 using the readout data.

The reflection mirrors 17 to 19 are reciprocally moved by a driving mechanism (not shown) to guide light reflected by the white plate 13 or the original 11 on the original table glass 12 to the CCD line sensor 21. The CCD line sensor 21 photoelectrically converts incident light, and outputs analog signals.

Figure 7:
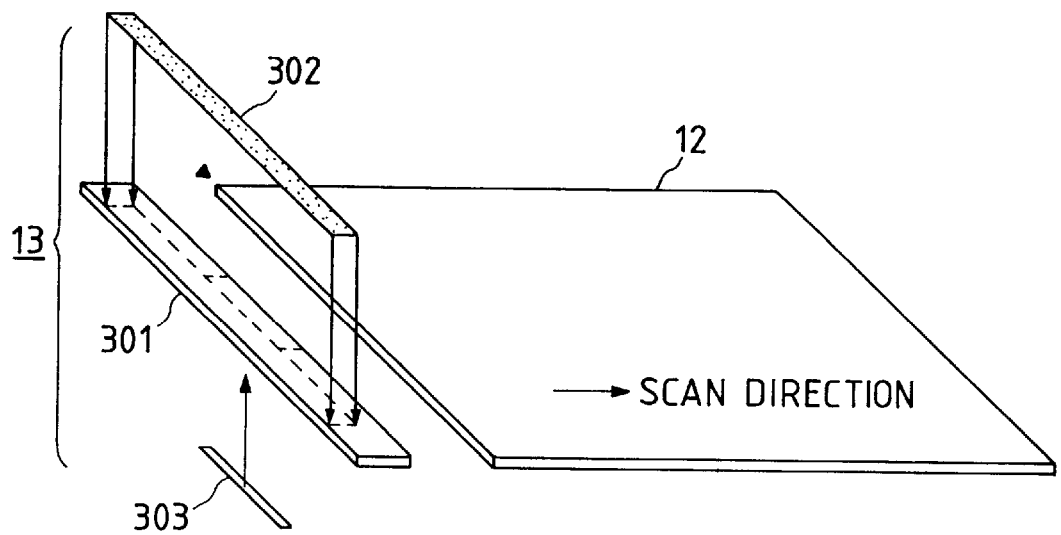
FIG. 7 is a perspective view showing the relationship between the white plate and the original table glass in the embodiment of the present invention.

FIG. 7 shows the arrangement of the white plate 13 and the original table glass 12. The white plate 13 is constituted by adhering an aluminum plate 302 painted in white on the upper surface of a glass plate 301 consisting of the same material as the original table glass 12, and a sticker 303 printed with a bar code pattern is adhered to the predetermined position on the lower surface of the glass plate 301.

Figure 8:
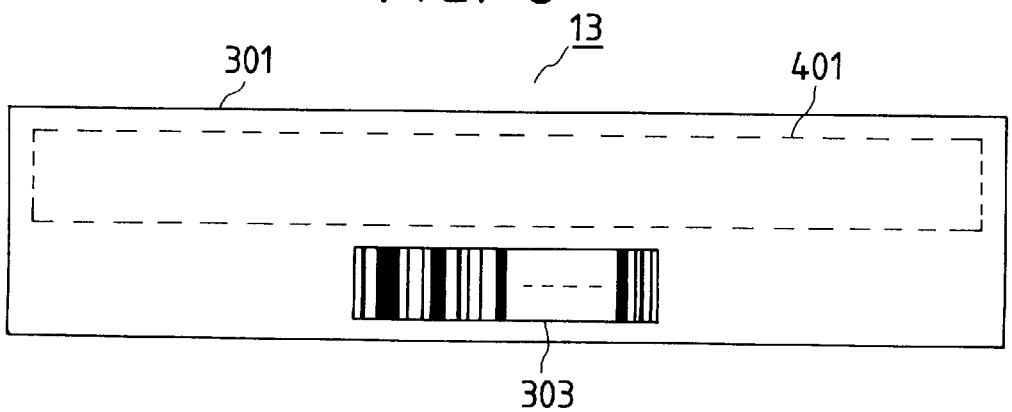
FIG. 8 is a view showing the arrangement of the white plate in the embodiment of the present invention.

FIG. 8 is a bottom view of the white plate. Referring to FIG. 8, a portion surrounded by a broken line 401 corresponds to a reference white portion adhered with the aluminum plate 302 painted in white. The bar code pattern printed on the sticker 303 records values $W_R$, $W_G$, and $W_B$ which are obtained by measuring the density level of the reference white portion in advance and converting the measurement result into R, G, and B values.

The role of the white plate 13 is to present reference data upon adjustment of the illumination light amount and the circuit gains so that R, G, and B outputs obtained by reading the white plate respectively match the values $W_R$, $W_G$, and $W_B$ recorded on the bar code pattern in the image pickup apparatus shown in FIG. 6.

The sequence for adjusting the illumination light amount (lamp adjustment) and adjusting the circuit gains in the normal reading mode will be described below with reference to the flow chart shown in FIG. 9 and FIGS. 10A to 10C.

In STEP 1, after the lamp lighting voltage and the circuit gains are set to be default values or previously adjustment values, the bar code pattern printed on the sticker 303 of the white plate 13 is read by the CCD line sensor 21. Then, A/D-converted data are temporarily stored in the memory 25 for the normal mode. The CPU 26 reads out and decodes the contents of the bar code pattern stored in the memory 25 to obtain $W_R$, $W_G$, and $W_B$ as the R, G, and B values recorded on the bar code pattern. In this case, $W_R=W_G=W_B=W_{RGB}$ is assumed for the sake of easy understanding. However, these values may be different from each other in practice.

In STEP 2, the lamp lighting voltage is adjusted. The circuit gain from the CCD line sensor 21 to the A/D converter 23 is set to be a default value, and in this state, the reference white portion 401 of the white plate 13 is read. Thereafter, A/D-converted R, G, and B digital data are temporarily stored in the memories 25, 35, and 45 for the normal mode. The CPU 26 reads out the contents of the memories 25, 35, and 45, and obtains maximum values $R_{max}$, $G_{max}$, and $B_{max}$ of image signals of the respective channels in the three memories 25, 35, and 45.

Figure 10A:
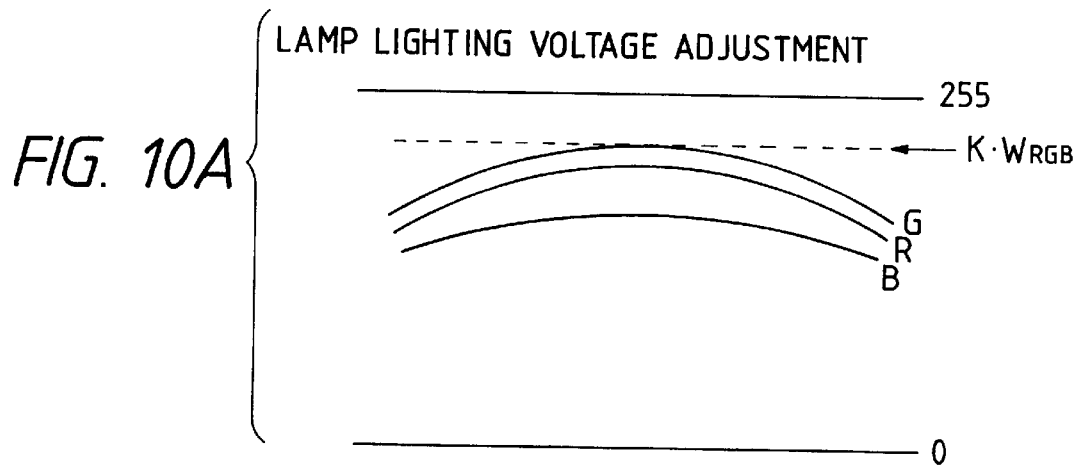
FIGS. 10A to 10C are waveform charts in the normal reading mode in the embodiment of the present invention.

Subsequently, lamp adjustment is performed to obtain a minimum lamp lighting voltage which satisfies at least one of conditions 1) to 3) below, as shown in FIG. 10A. Note that the lamp adjustment value is represented by $L_V$.

$$R_{max} - K \cdot W_R \approx 0 \qquad 1)$$

$$G_{max} - K \cdot W_G \approx 0 \qquad 2)$$

$$B_{max} - K \cdot W_B \approx 0 \qquad 3)$$

In this case, condition 2) is satisfied. Note that K is a predetermined value equal to or smaller than unity, and for example, 0.9 is used, as will be described later.

Figure 10B:
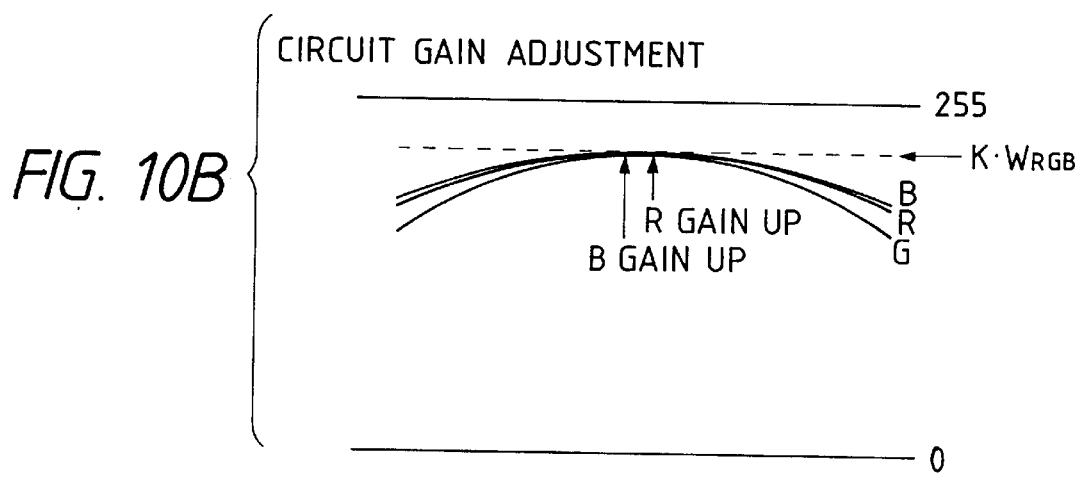

In STEP 3, the circuit gains are adjusted. As shown in FIG. 10B, after the lamp adjustment, the circuit gains are adjusted to satisfy all conditions 1) to 3) above in all the R, G, and B channels. Note that the adjustment values are $A_R$, $A_G$, and $A_B$.

Finally, the flow advances to STEP 4. After the lamp adjustment and gain adjustment, generation of correction data is required. Upon generation of shading correction data, the adjustment value $L_V$ is set in the lamp lighting voltage, and the values $A_R$, $A_G$, and $A_B$ are set in the circuit gains. In this state, the white plate 13 is read by the CCD line sensor 21, and A/D-converted data for one line are temporarily stored in the memories 25, 35, and 45 for the normal mode in units of colors.

Figure 10C:
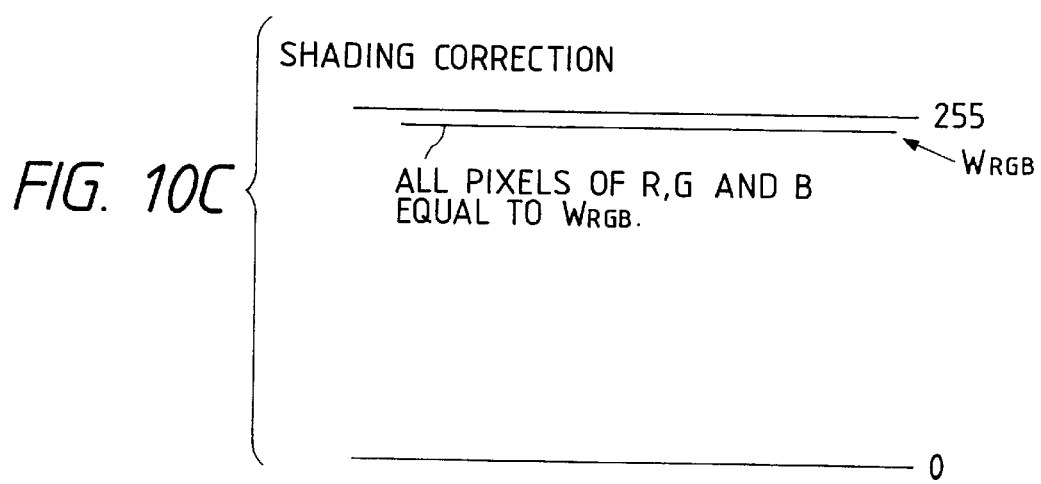

Thereafter, the CPU 26 reads out the stored data in units of colors, converts the readout data into shading correction data for attaining shading correction to the values $W_R$, $W_G$, and $W_B$ in units of pixels, and re-stores the converted data in the memories 25, 35, and 45 for the normal mode, thus ending generation of shading correction data. Upon reading of an original, the shading correction circuits 24, 34, and 44 perform predetermined arithmetic operations using A/D-converted original image data and the correction data at the corresponding addresses on the memories 25, 35, and 45 for the normal mode, so that all the pixels have the values $W_R$, $W_B$, and $W_G$, thus attaining shading correction. FIG. 10C shows shading-corrected data.

Since each of the memories 25, 35, and 45 has a finite number of bits, the correction range of each of the shading correction circuits 24, 34, and 44 is limited to, e.g., ×1 to ×2.

Therefore, when the correction range of each of the shading correction circuits 24, 34, and 44 is limited to ×1 to ×2 in terms of the hardware arrangement, if the value K is not set to be a value equal to or smaller than unity (e.g., 0.9), a region which cannot normally be subjected to shading correction is generated. The constant K is used to solve such a problem and to reliably read the density of the white portion.

Figure 11:
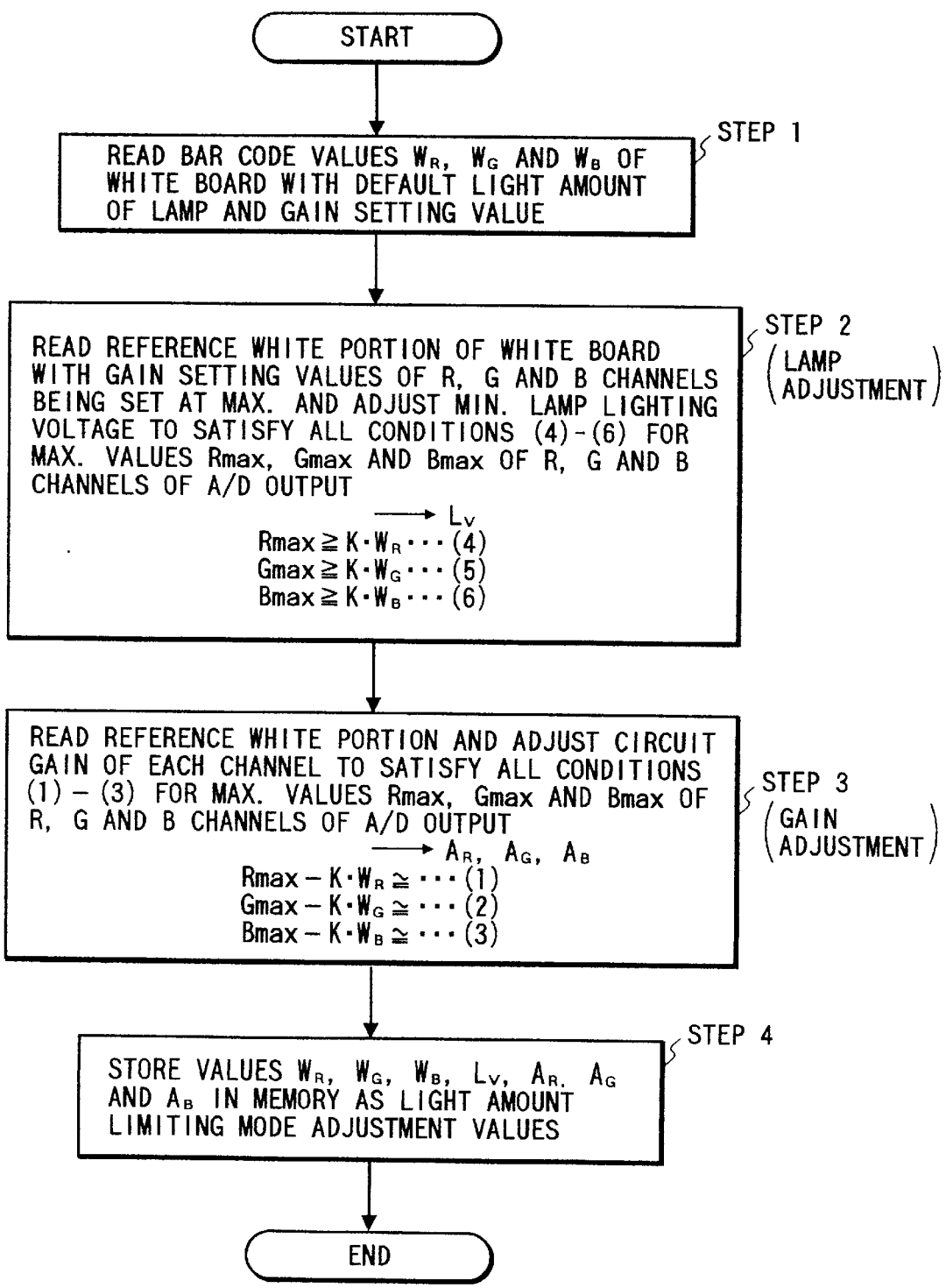
FIG. 11 is a flow chart showing a light amount limitation mode in the embodiment of the present invention.

FIG. 11 shows the sequence for adjusting the light amount in the light amount limitation mode in the embodiment of the present invention. In STEP 1, after the lamp lighting voltage and the circuit gains are set to be default values or previously adjustment values, the bar code pattern printed on the sticker 303 of the white plate 13 is read by the CCD line sensor 21. Then, A/D-converted data are temporarily stored in the memory 51 for the light amount limitation mode. The CPU 26 reads out the contents of the memory 51 and decodes the contents of the bar code pattern, thus obtaining the R, G, and B values $W_R$, $W_G$, and $W_B$ recorded on the bar code pattern. In the following description, $W_R=W_G=W_B=W_{RGB}$ is also assumed.

In STEP 2, the lamp lighting voltage is adjusted. The circuit gain from the CCD line sensor 21 to the A/D converter 23 is set to be a maximum value, and in this state, the reference white portion 401 on the white plate 13 is read. Then, A/D-converted R, G, and B digital data are temporarily stored in the memories 51, 52, and 53 for the light amount limitation mode.

Figure 12A:
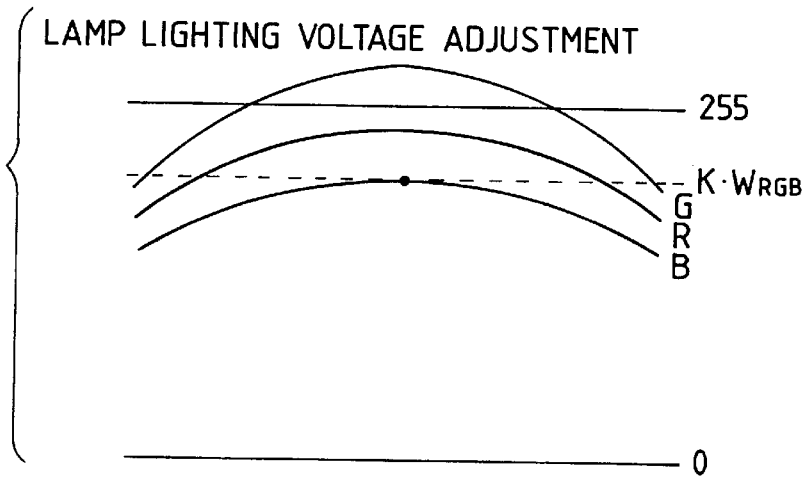
FIGS. 12A to 12C are waveform charts in the light amount limitation mode in the embodiment of the present invention.

The CPU 26 reads out the contents of the memories 51, 52, and 53 and obtains maximum values $R_{max}$, $G_{max}$, and $B_{max}$ of the respective channels of image signals in the three memories 51, 52, and 53. Thereafter, lamp adjustment is performed to obtain a minimum lamp lighting voltage which satisfies all conditions 4) to 6) below, as shown in FIG. 12A. Note that the lamp adjustment value is represented by $L_V$.

$$R_{max} \geq K \cdot W_R \qquad 4)$$

$$G_{max} \geq K \cdot W_G \qquad 5)$$

$$B_{max} \geq K \cdot W_B \qquad 6)$$

where K is a predetermined value equal to or smaller than unity as in the normal reading mode, and for example, 0.9 is used.

Figure 12B:
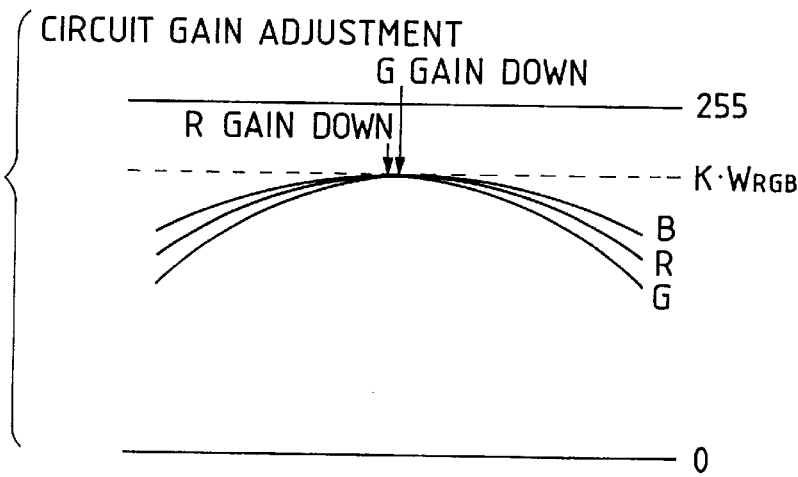
Figure 12C:
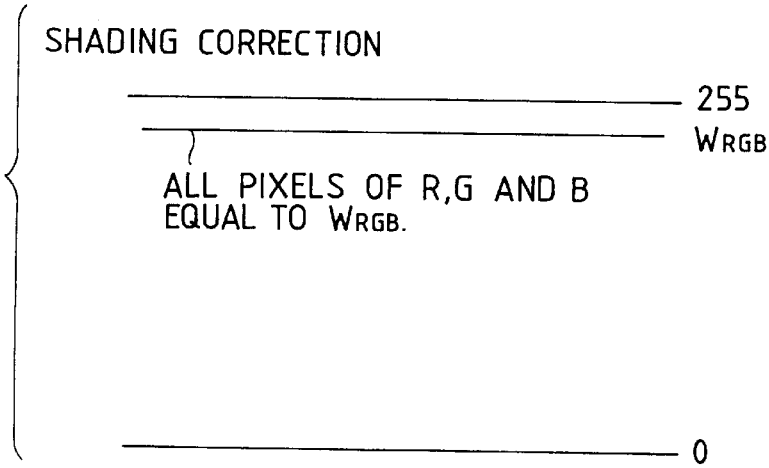

In STEP 3, the circuit gains are adjusted. As shown in FIG. 12B, after the lamp adjustment, the circuit gains are adjusted to satisfy all conditions 1) to 3) above in all the R, G, and B channels. Note that the adjustment values are $A_R$, $A_G$, and $A_B$.

Finally, the flow advances to STEP 4. The values $W_R$, $W_G$, $W_B$, $L_V$, $A_R$, $A_G$, and $A_B$ obtained in the above-mentioned process are stored in the memories 51, 52, and 53 as the adjustment values in the light amount limitation mode as in the normal reading mode.

FIG. 12B shows the state of the gain-adjusted signal.

In this manner, since the circuit gain adjustment is performed for mainly decreasing the gains, no gains larger than the maximum values of the gains set in STEP 2 are required.

Since the gain for at least one of the R, G, and B channels is set to be a maximum gain value that the circuit is capable of coping with, the light amount is adjusted to a minimum light amount that the circuit is capable of coping with. Therefore, in the normal image reading mode, shading correction can be performed by reading out the lamp adjustment value and the gain setting values for the normal image reading mode from the memories and setting these values. In the light amount limitation mode, shading correction can be performed by reading out the lamp adjustment value and the gain setting values for the light amount limitation mode from the memories and setting these values.

Even when the object is a glossy body, since the apparatus can quickly change the mode and picks up an image in the minimum light amount that the circuit is capable of coping with, a high-quality image can be picked up while preventing blooming.

In this embodiment, a case has been exemplified wherein the object is a glossy body. Also, when a transparent original has, e.g., a pinhole, the light amount limitation mode may be selected.

What is claimed is:

1. An image pickup apparatus comprising:
   (A) a light source for illuminating an object;
   (B) image pickup means for picking up an image of the object illuminated by said light source and outputting image signals of a plurality of colors;
   (C) adjustment means for adjusting a light amount of said light source;
   (D) a plurality of amplifier means respectively for amplifying said image signals of the plurality of colors output from said image pickup means; and
   (E) control means for when said image pickup means picks up a reference density member, setting gains of all of said plurality of amplifier means to substantial maximums respectively, controlling said adjustment means to adjust light amount of said light source so that all of maximums of said image signals of the plurality of colors output from said plurality of amplifier means exceed a predetermined value, and subsequently controlling the gains of said plurality of amplifier means so that all of the maximums of said image signals of the plurality of colors output from said plurality of amplifier means become substantially equal to said predetermined value.

2. An apparatus according to claim 1, further comprising:
   storage means for storing an adjustment value of said light source adjusted by said control means.

3. An apparatus according to claim 1, further comprising:
   separation means for separating the output from said image pickup means into a plurality of color components,
   wherein said control means controls the light amount of said light source for each of the plurality of color components separated by said separation means.

4. An apparatus according to claim 3, wherein said separation means comprises a filter.

5. An apparatus according to claim 4, wherein said filter comprises a color filter.

6. An image pickup apparatus comprising:
   (A) a light source for illuminating an object;
   (B) image pickup means for picking up an image of the object illuminated by said light source and outputting image signals of a plurality of colors;
   (C) adjustment means for adjusting a light amount of said light source;
   (D) a plurality of amplifier means respectively for amplifying said image signals of the plurality of colors output from said image pickup means;
   (E) correction means for correcting the image signals output from said image pickup means, on the basis of reference data;
   (F) a reference density member having a reference density; and
   (G) control means for when said image pickup means picks up a reference density member to generate said reference data, setting gains of all of said plurality of amplifier means to substantially maximums respectively, controlling said adjustment means to adjust the light amount of said light source so that all maximums of said image signals of the plurality of colors output from said plurality of amplifier means exceed a predetermined value, and subsequently controlling the gains of said plurality of amplifier means so that all of the maximums of said image signal of the plurality of colors output from said plurality of amplifier means become substantially equal to said predetermined value.

7. An apparatus according to claim 6, further comprising:
   storage means for storing the light amount value of said light source and the gain of said amplifier means, which are controlled by said control means.

8. An apparatus according to claim 6, wherein said reference density member is white.

9. An apparatus according to claim 6, further comprising holding means for indicating the density level.

10. An apparatus according to claim 6, further comprising:
    holding means for holding a density value of said reference density member,
    wherein the predetermined value is a product of the density value held by said holding means with a predetermined constant.

11. An apparatus according to claim 10, wherein said holding means comprises a bar code.

12. An apparatus according to claim 6, further comprising:
    separation means for separating the output from said image pickup means into a plurality of color components.

13. An apparatus according to claim 12, wherein said separation means comprises a filter.

14. An apparatus according to claim 13, wherein said filter comprises a color filter.

15. An apparatus according to claim 10, wherein the predetermined constant is less than 1.

16. An image pickup apparatus comprising:
    (A) a light source for illuminating an object;
    (B) image pickup means for picking up an image of the object illuminated by said light source;
    (C) adjustment means for adjusting a light amount of said light source;
    (D) control means for controlling said adjustment means in such a manner that an image pickup operation of said image pickup means is performed under illumination of the object with a predetermined amount of light by said light source in a normal mode and the image pickup operation of said image pickup means is performed under illumination of the object with an amount of light less than said predetermined amount of light by said light source in a light amount limitation mode;
    (E) first storage means for storing a control result of said control means in the normal mode; and
    (F) second storage means for storing a control result of said control means in the light amount limitation mode.

17. An apparatus according to claim 16, wherein said control means controls storage of a control result upon selection of the normal mode in said first storage means, and controls storage of a control result upon selection of the light amount limitation mode in said second storage means.

18. An apparatus according to claim 17, further comprising:
   amplifier means for amplifying the output from said image pickup means,
   wherein said control means controls a gain of said amplifier means and a light amount of said light source, and the control result includes the gain and the light amount controlled by said control means.

19. An apparatus according to claim 18, wherein said control means sets the gain of said amplifier means to be a maximum value, and thereafter, performs light amount control of said light source in the light amount limitation mode.

20. An image pickup method comprising:
   an image pickup step of picking up an image of the object illuminated by a light source and outputting image signals of a plurality of colors;
   an adjustment step of adjusting a light amount of said light source;
   an amplifying step of amplifying by a plurality of amplifier means, said image signals of the plurality of colors output in said image pickup step; and
   a control step of when said image pickup step picks up a reference density member, setting gains of all of said plurality of amplifier means to substantial maximums respectively, controlling said adjustment step to adjust light amount of said light source so that all of maximums of said image signals of the plurality of colors output from said plurality of amplifier means exceed a predetermined value, and subsequently controlling the gains of said plurality of amplifier means so that all of the maximums of said image signals of the plurality of colors output from said plurality of amplifier means become substantially equal to said predetermined value.

21. An image pickup apparatus comprising:
   (A) a light source for illuminating an object;
   (B) image pickup means for picking up an image of the object illuminated by said light source and outputting image signals of a plurality of colors;
   (C) adjustment means for adjusting a light amount of said light source;
   (D) amplifier means for respectively amplifying said image signals of the plurality of colors output from said image pickup means; and
   (E) control means for, when said image pickup means picks up a reference density member, setting gains of all of said plurality of colors to substantial maximums respectively, controlling said adjustment means to adjust light amount of said light source so that all of maximums of said image signals of the plurality of colors output from said amplifier means exceed a predetermined value, and subsequently controlling the gains of said amplifier means so that all of the maximums of said image signals of the plurality of colors output from said amplifier means become substantially equal to said predetermined value.

22. An apparatus according to claim 21, further comprising:
   storage means for storing an adjustment value of said light source adjusted by said control means.

23. An apparatus according to claim 21, further comprising:
   separation means for separating the output from said image pickup means into a plurality of color components,
   wherein said control means controls the light amount of said light source for each of the plurality of color components separated by said separation means.

24. An apparatus according to claim 23, wherein said separation means comprises a filter.

25. An apparatus according to claim 24, wherein said filter comprises a color filter.

26. An image pickup apparatus comprising:
   (A) a light source for illuminating an object;
   (B) image pickup means for picking up an image of the object illuminated by said light source and outputting image signals of a plurality of colors;
   (C) adjustment means for adjusting a light amount of said light source;
   (D) amplifier means for respectively amplifying said image signals of the plurality of colors output from said image pickup means;
   (E) correction means for correcting the image signals output from said image pickup means, on the basis of reference data;
   (F) a reference density member having a reference density; and
   (G) control means for, when said image pickup means picks up a reference density member to generate said reference data setting gains of all of said plurality of colors to substantially maximums respectively, controlling said adjustment means to adjust the light amount of said light source so that all maximums of said image signals of the plurality of colors output from said amplifier means exceed a predetermined value, and subsequently controlling the gains of said amplifier means so that all of the maximums of said image signals of the plurality of colors output from said amplifier means become substantially equal to said predetermined value.

27. An apparatus according to claim 26, further comprising:
   storage means for storing the light amount value of said light source and the gain of said amplifier means, which are controlled by said control means.

28. An apparatus according to claim 26, wherein said reference density member is white.

29. An apparatus according to claim 26, farther comprising holding means for indicating the density level.

30. An apparatus according to claim 26, further comprising:
   holding means for holding a density value of said reference density member,
   wherein the predetermined value is a product of the density value held by said holding means with a predetermined constant.

31. An apparatus according to claim 30, wherein said holding means comprises a bar code.

32. An apparatus according to claim 6, further comprising:
   separation means for separating the output from said image pickup means into a plurality of color components.

33. An apparatus according to claim 32, wherein said separation means comprises a filter.

34. An apparatus according to claim 33, wherein said filter comprises a color filter.

35. An apparatus according to claim 30, wherein the predetermined constant is less than 1.

* * * * *

UNITED STATES PATENT AND TRADEMARK OFFICE
CERTIFICATE OF CORRECTION

PATENT NO. : 6,025,933
DATED : February 15, 2000
INVENTOR(S) : Kazuhito Ohashi

It is certified that error appears in the above-identified patent and that said Letters Patent is hereby corrected as shown below:

Column 5,
Lines 28-32, Equations 1), 2) and 3) should be changed from
"$R_{max} - K \cdot W_R \approx 0$
$G_{max} - K \cdot W_G \approx 0$
$B_{max} - K \cdot W_B \approx 0$" to
-- $R_{max} - K \cdot W_R \simeq 0$
$G_{max} - K \cdot W_G \simeq 0$
$B_{max} - K \cdot W_B \simeq 0$ --

Signed and Sealed this

Twelfth Day of February, 2002

Attest:

JAMES E. ROGAN
Attesting Officer
Director of the United States Patent and Trademark Office